Aug. 10, 1937.  E. GOOSCH  2,089,788
HAT BLOCKING MACHINE
Filed Sept. 19, 1934  3 Sheets—Sheet 1

INVENTOR
Emil Goosch

Aug. 10, 1937.  E. GOOSCH  2,089,788
HAT BLOCKING MACHINE
Filed Sept. 19, 1934   3 Sheets-Sheet 2
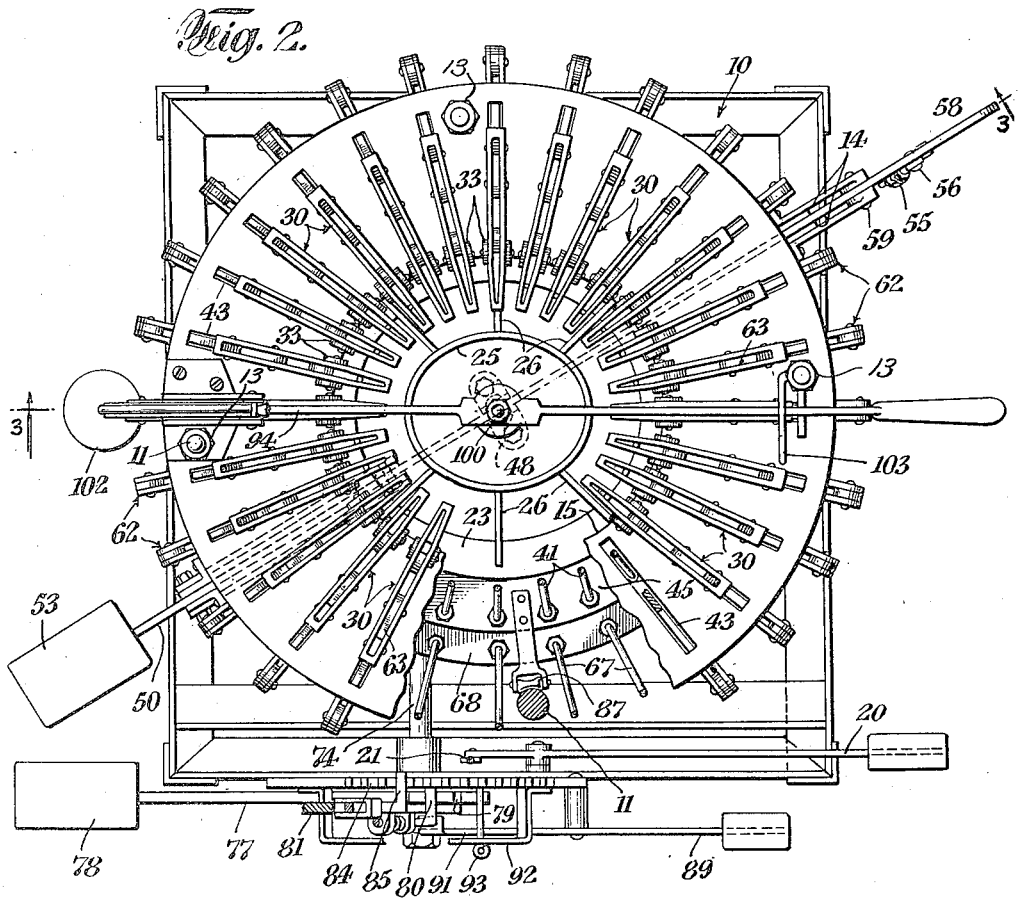
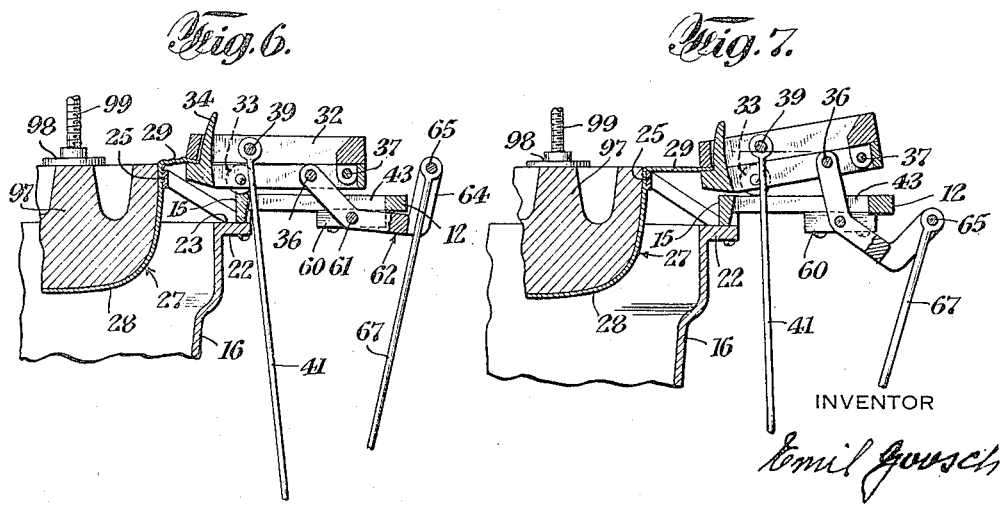
INVENTOR
Emil Goosch Aug. 10, 1937.   E. GOOSCH   2,089,788
HAT BLOCKING MACHINE
Filed Sept. 19, 1934   3 Sheets-Sheet 3
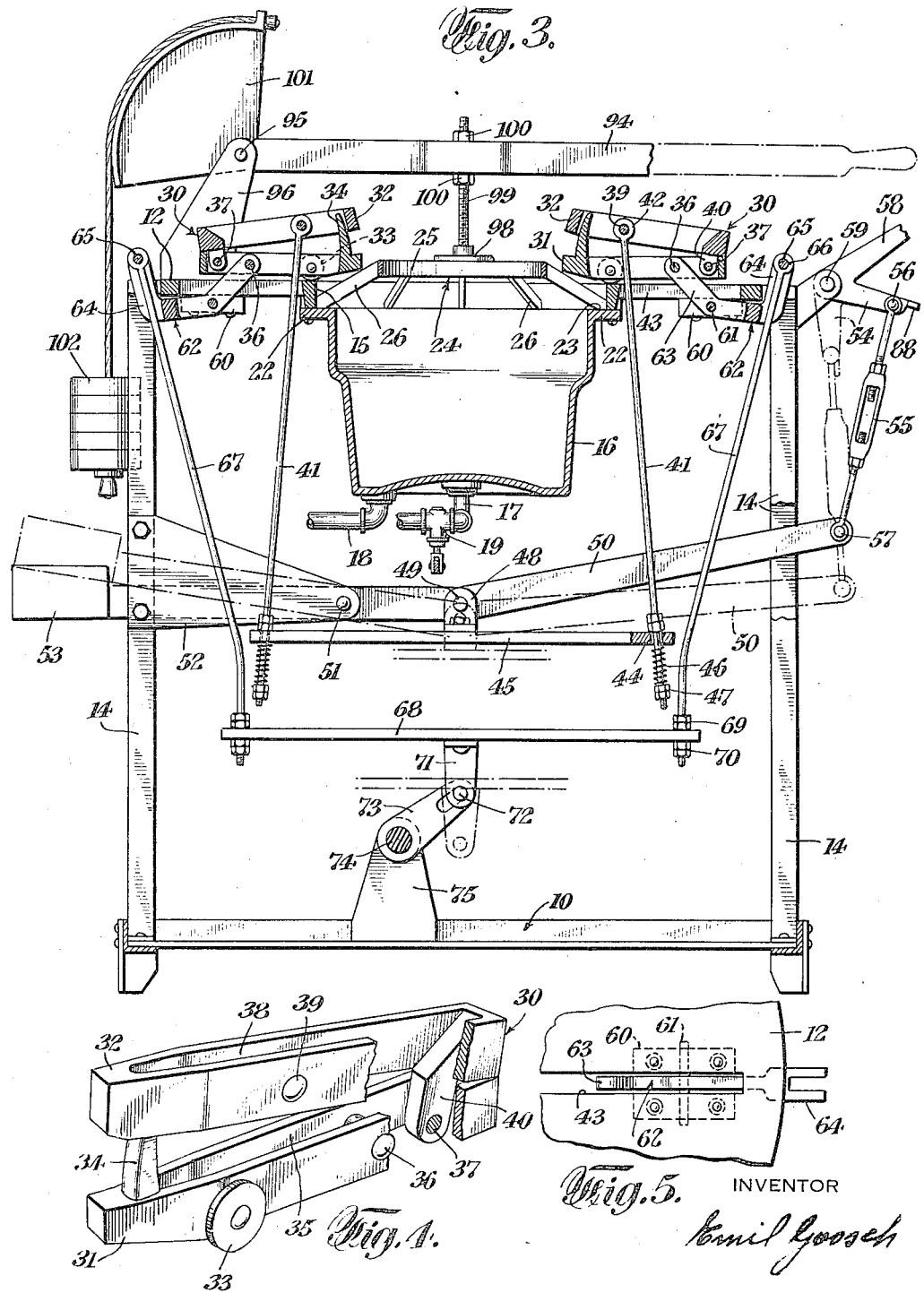

Patented Aug. 10, 1937

2,089,788

UNITED STATES PATENT OFFICE 2,089,788

HAT BLOCKING MACHINE

Emil Goosch, New York, N. Y.

Application September 19, 1934, Serial No. 744,651

5 Claims. (Cl. 223—15)

This invention relates generally to improvements in hat blocking machines, and refers more particularly to the type for stretching of the brim and shaping the crown of a hat.

The invention resides in the novel combination and arrangement of parts to accomplish the above in a simple and efficient manner.

Heretofore, in machines of this character, the gripping jaws that are employed to grasp the brim of a hat body to be stretched have been operated by rigid connections thereto. These jaws are generally operated from a common source and due to the rigid connection to the individual jaws, very fine and careful machining is necessary in order that all of the individual jaws grip with an even pressure. It has also been necessary in machines having rigid connections to the individual jaws, to provide each of the jaws with delicate adjusting means so as to accomplish even gripping pressure on the hat brim in each of the clamping jaws.

In these machines with rigid connections the proper adjustment was difficult and costly to obtain. At best the machine could not be made to operate perfectly. Some of the jaws slipped during the stretching operation when a brim of uneven thickness was grasped. An uneven stretch would generally result. Of those jaws that had no fine adjustment means, frequent re-adjustment of these jaws was necessary. In both the aforementioned types of machines the serious defect of uneven gripping pressure on a hat brim of an uneven thickness throughout its perimeter, would allow the brim to slip from between those jaws that gripped the brim lightly, and a poorly stretched brim would result.

Other machines in the prior art have certain parts in close proximity to a steam pot which is usually associated with machines of this type, thereby requiring frequent adjustment of the jaw gripping assembly due to the effect of the heat and moisture on these parts.

The principal object of the invention is to provide a machine of rugged construction, having certain novel arrangements resulting in an inexpensive machine that is unlikely to get out of order or to require adjustments of the various parts in assembly or even after extensive use.

Another main object is to provide novel clamping jaws adapted to clamp the brim of a hat, which jaws are further adapted to move radially outward to stretch said brim of the hat evenly all around, without the danger of the gripping jaws becoming loosened during this stretching operation.

Another object of the invention is to provide novel operating means for the opening and closing of said jaws and novel operating means for pulling the jaws evenly and radially outward.

Another object of the invention is to provide in a machine of the character described, a common operating plate associated with all of the clamping jaws, each of which being operated through the means of an individual spring.

Another object of the invention is to provide clamping means in the machine of the character described, wherein the individual clamps are independent in their clamping pressure adjustment from any other clamps.

Another object of the invention is to provide a machine of the character described, wherein the yieldable connections for controlling the closing pressure of the clamp jaws are so remotely disposed from the steam pot as to be unaffected by the heat and moisture emanating therefrom.

Another object of the invention is to provide clamping means that have a tendency to increase their clamping pressure as the stretching of the brim proceeds.

A still further object of the invention is to provide means for effecting the even pulling out of a hat brim all around.

Other objects and advantages not particularly pointed out, will become apparent from the following description, having reference to the accompanying drawings, wherein:—

Figure 2 is a plan view thereof with certain parts broken away and other parts omitted.

Figure 3 is a vertical sectional view taken substantially on the line 3—3—3 of Figure 2.

Figure 4 is a fragmentary perspective view of the clamping jaws employed.

Figure 5 is a fragmentary plan view of some of the parts employed.

Figure 6 is a fragmentary detail sectional view, showing the jaws in the clamped position.

Figure 7 is a similar view, showing the clamped jaws moved radially outward to stretch the brim.

Figure 1:
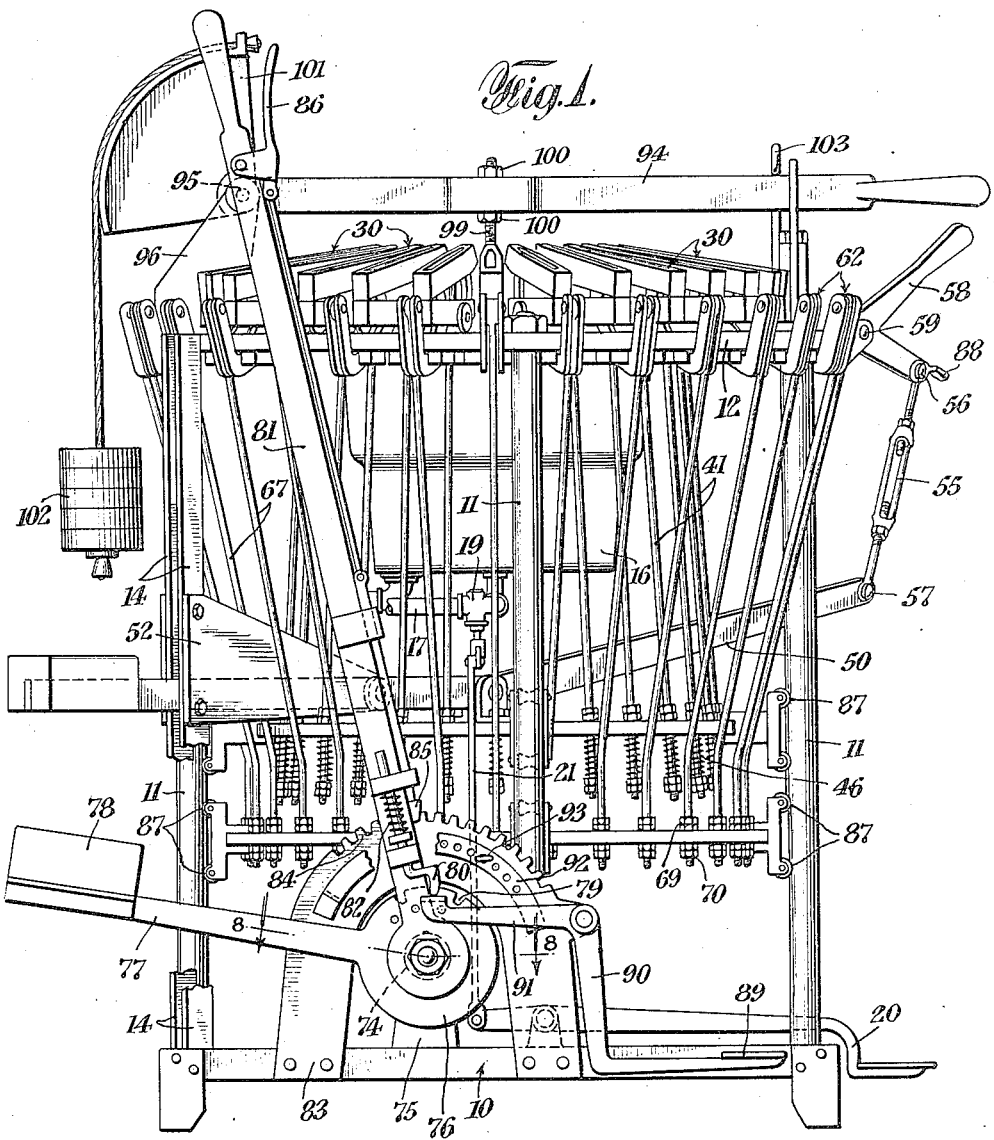
Figure 1 is a front elevation of a machine constructed in accordance with the invention.

The reference character 10 designates a base frame having suitably secured thereto, a plurality of upright bars 11, suitably shouldered to support a main plate 12 held thereto, by means of nuts 13. Secured between the base 10 and the main plate 12, are a plurality of vertical guide bars 14, which assist the upright bars in strengthening the structure. A large opening 15, central of the main plate 12 is elliptical in shape, of such dimensions resembling the shape of a hat.

Secured underneath the main plate 12, is a steam pot 16 having a suitable steam inlet connection 17, and a steam outlet connection 18, at the bottom of the pot. The steam inlet 17 is provided with a steam valve 19 suitably controlled by a foot lever 20, which is connected to the valve 19 by a link 21. A flange 22 is provided at the upper edge of the pot where it is secured to the main plate 12, which extends inwardly of the elliptical opening in the plate, to provide a shoulder or shelf 23.

A member 24 comprising an elliptical ring 25, has radial legs 26 extending outward therefrom which are adapted to rest on the shoulder 23. These legs 26 are adapted to contact with the opening 15 in the main plate, to position the ring 25 centrally of the opening 15.

As seen in Figure 6, this ring is adapted to receive an unblocked hat body 27 therein, with the crown 28 inverted. The brim portion 29 of a hat body will thus extend radially outward of the ring 25.

Adapted to grasp the edge of the brim 29, are a plurality of clamps 30. These clamps are arranged to operate on the upper face of the main plate 12. They extend inwardly sufficiently to grasp the edge of the brim, and are then caused to move radially outward, by means to be described later. These clamps are also arranged in an elliptical manner, so that during their inward position they grasp the brim a like distance all around.

The clamp 30 comprises two complementary members 31 and 32. A lower jaw member 31 has suitably secured thereto a pair of rollers 33 adapted to roll on the main plate 12, and an upwardly extending guide member 34. A vertical slot 35 in this member extends longitudinally thereof. A pin 36 in the member 31 is adapted to span the slot 35. Another pivot pin 37 radially outward of the first mentioned pin and near the outward end of a slot 35, similarly spans the slot 35.

The upper jaw member 32 adapted to cooperate with the lower jaw member 31, has a vertical longitudinal slot 38 therein. A pin 39, in the member 32, is adapted to span the slot 38. At the outward end of the jaw member 32 and extending into the slot 35 of the lower jaw member, is a lug 40 adapted to pivotally embrace the pivot pin 37.

The upper jaw member 32 is adapted to be moved toward and away from the lower jaw member 31 to clamp the brim of the hat normally disposed between these jaw members. The edge of the brim extends to and is stopped against the guide pin 34. This guide pin 34 not only governs the radial length of the bite on the brim, but also acts as a positioning means for the hat body. The jaw members are also secured against transverse displacement in their inward gripping portions by this pin 34.

A substantially long rod 41 having an eye 42 at the upper end thereof is adapted to embrace the pin 39. By this means it will be seen that in raising or lowering the rod 41, the jaw 32 will be moved toward and away from the jaw 31, to effect the respective gripping and loosening of the brim.

The rods 41 depending from each of the clamps 30, are adapted to extend through the slots 35 in the lower jaw member, and through radial slots 43 in the main plate 12. These rods 41 are adapted to pass through suitable openings 44 in a master plate 45, which is disposed below the steam pot 16. Each of the rods 41 is surrounded by a spring 46, disposed between the under side of the master plate 45 and lock nuts 47, at the end of the rod.

The plate 45 is provided with a lug 48, adapted to carry a pin 49, pivotally associated with a lever 50. This lever is pivoted as at 51 to support plates 52 extending inwardly from the guide bars 14.

At one end of the lever 50, is a weight 53 adapted to overbalance the operating parts at the other end of said lever. As seen in Figure 3, the lever 50 extends to the right and is associated at that end with a toggle operating means. A link 54, provides one leg of the toggle, and a turn-buckle, the other. The link 54 and turn-buckle 55 are pivoted as at 56. The turn-buckle is secured to the lever 50 as at 57. The link 54 forms part of a hand operating crank 58, pivoted as at 59 to the upright bars 14, on that side of the frame.

By this arrangement, it will be seen that by operating the hand crank 58 downwardly, the master plate is caused to move downwardly, as indicated in dot and dash lines in Figure 3. Compression of the springs 46 and moving the upper jaws 32 toward the jaw member 31 results. This upper jaw member 32 will move until it is in contact with the brim of the hat, whereupon further movement of the handle 58, the master plate 45 will move downward against the springs 46 and the brim will be gripped with greater pressure. Under normal conditions the device is so set, that upon such operation of the hand crank 58, the springs are compressed considerably.

The upper jaw member will contact the brim after the handle has been moved half way its full travel with comparatively light pressure. The springs 46 are further compressed during the last portion of the movement of the handle to insure the gripping pressure. By this means substantially equal clamping pressure is obtained in each of the clamps 30 on the brim irrespective of one another. The individual clamps in gripping a thin or thick portion of the brim, are not subject to any appreciable variation in the gripping pressure.

Secured beneath the main plate 12 are a plurality of blocks 60, which are adapted to support pins 61. These pins are disposed beneath the slots 43 in the main plate and are adapted to pivotally support a crank member 62, having an upwardly and inwardly extending leg 63, adapted to embrace the pin 36 in the lower jaw member 32. This leg 63 extends into the slot 35 in this lower jaw member.

An outwardly and upwardly extending leg portion 64 of the crank member 62, has a pin 65 at its extremity which is adapted to be embraced by an eye 66 of a rod 67.

The leg portion 64 is bifurcated to allow the rods 67 to extend downwardly therethru. The rods 67 associated with each of the clamps 30, are secured to a master plate 68 disposed below the master plate 45.

Lock nuts 69 and 70 associated with these rods 67, and disposed on either side of the master plate 68, are adapted to provide adjusting means to position all these rods alike with respect to the clamps.

Extending downwardly from the master plate 68 is a lug 71 having a pin 72 associated therewith. Adapted to cooperate with this pin 72 is a lever 73 having a slotted end engaging the pin 72. This lever 73 is suitably secured to a cross shaft 74, journalled and supported in brackets 75, extending from the base frame 10.

Figure 8:
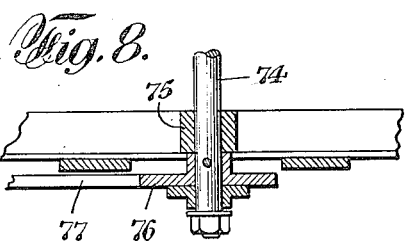
Figure 8 is a fragmentary sectional view, taken substantially on the line 8—8 of Figure 1.

Secured to the cross shaft 74, as illustrated in Figure 8, is a disc 76 having an arm 77 extending therefrom. A counter weight 78 at the outward extremity of the arm assists in balancing the parts.

Notches 79 are provided in the periphery of the disc, which are engageable by a dog finger 80, slidably secured to a hand lever 81. This dog finger 80 is provided with a spring 82, to urge the finger into engagement with one of the notches 79, thereby keying the lever 81 to the cross shaft 74.

Secured to the base frame 10 is an arcuate segment 83, provided with a plurality of teeth 84 on its periphery, engageable by a retractable dog 85 which is controlled by a hand grip 86 at the upper end of the lever 81. This last mentioned means is provided to lock the associated parts in position. By this construction the clamps 30 may be operated by the lever 81. When the lever 81 is pulled, after disengaging the lock 84, the cross shaft 74 is rotated in a clockwise direction, thereby pulling down the master plate 68. The downward movement of this master plate 78 will cause the crank member 62 to operate around the pivot 61 and thereby move the clamps radially outwardly.

The different positioning of the parts between Figures 6 and 7, illustrate the effect of the outward movement of the clamps 30. It will be noted in Figure 7, that the clamp 30 is inclined during such outward movement. This is for the purpose of raising the pin 39 during said outward movement, to maintain or increase the clamping pressure as the clamps are moved outwardly, depending on the angular attack of the lever 63 of the crank 62. It is preferred to arrange these parts to raise the pin 36 sufficiently high to compensate for the slight loss of pressure, which is lost during the raising of the pin 39 in its arcuate movement outwardly.

The master plates 45 and 68 are provided with rollers 87 engageable with the vertical rods 11, to maintain vertical alignment of these plates.

The toggle lever 54 is provided with a projection 88 to allow the parts to be set in position slightly beyond dead center as indicated in dot and dash lines in Figure 3, to maintain these parts in a locked position.

The turn-buckle provides means for adjusting the amount of movement of the master plate 45 to control the clamping pressure desired.

The dog finger 80 may be disengaged from its slot by depression of a pedal 89 which forms part of a bell crank 90 having an arm 91 engageable with the finger 80, to lift the finger against the action of the spring 82 to permit relocation of these parts.

An arcuate guide bar 92 is provided on the segment 83 to assist in limiting the movement of the arm 81. This bar is provided with a plurality of holes which correspond with holes in the segment 83 for the reception of a stop pin 93.

A lever 94 is pivoted as at 95 on a bracket 96, which is suitably secured to the main plate 12. The lever 94 is adapted to cooperate with a hat block 97. This block 97 is placed inside of a hat body and by pulling down of the lever 94 will be suitably fitted inside of said crown, thereby assisting partly in blocking the crown of the hat as well as assisting in defining the edge between the crown and the brim.

This lever 94 has secured to it a plate 98 which is adjustable by means of a threaded stem part 99, secured by lock nuts 100.

A sector 101 is provided on the lever 94, and has cooperating therewith a counterweight 102 to maintain an even reaction to the operation of the handle throughout its entire operative stroke. Locking means are provided as at 103 to maintain this lever 94 in position during operation.

In the operation of the device when the lever 58 is moved downwardly the clamps are gripped around the edge of a hat brim, as shown in Figure 6, and upon movement of the lever 81 counter-clockwise, as seen in Figure 1, the master plate 68 is pulled downwardly, thereby moving all of the clamps radially outwardly to stretch the brim evenly all around. During the time that this stretching of the brim takes place, the pressure between the jaws of the clamps is maintained or even slightly increased due to the raising of the outward ends of the clamps, which raise the pin 39 slightly, and results in further compression of the springs 46 during the outward movement of the clamps.

Figure 9:
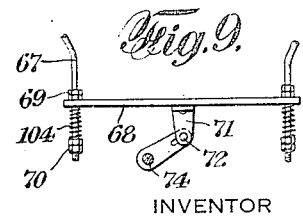
Figure 9 is a fragmentary view, illustrating a modification of the invention.

In the modification shown in Figure 9 springs 104 are shown as disposed between the plate 68 and the lock nuts 70 of each of the bars 67. An even stretching of the brim may be accomplished by this means.

Having thus described what is considered the preferred embodiments of the invention, it will be understood that various changes in the detail construction may be made, without departing from the spirit and cooperate function of the various elements of the device, as defined in the claims hereto appended.

I claim:

1. In a hat blocking machine of the character described, clamps to grip the brim of a hat and adapted to move radially outward to stretch the brim, a stationary plate for supporting the clamps, and rollers secured to the clamps to ride on the plate during their outward movement.

2. In a hat blocking machine of the character described, clamps to grip the brim of a hat and adapted to move outwardly, a single stationary plate for supporting the clamps, means for moving the clamps radially, and means for tilting the clamps during their movement.

3. In a hat blocking machine of the character described having a table, a plurality of clamps adapted to grip the brim of a hat and to move outwardly to stretch the brim, rollers on said clamps adapted to ride on the table, and means for tilting the clamps about the axis of the rollers during their brim stretching movement.

4. In a hat blocking machine of the character described having a plurality of clamps adapted to grip the brim of a hat and adapted to move outward to stretch the brim when so gripped, means for closing said clamps on the brim including links pivoted at their ends whereby the clamps tend to open during their outward movement and means for tilting the clamps whereby the clamps remain closed during their outward movement.

5. In a hat blocking machine of the character described, clamp mechanism for gripping the brim of a hat and adapted to move outwardly to stretch the brim comprising a jaw, a member having a stationary pivot, said member having a pivotal connection with said jaw, a swingable link having pivotal connection to said member, a second jaw pivoted to the first mentioned jaw and having pivotal connection with a second swingable link.

EMIL GOOSCH.